United States Patent
Tsoukatos et al.

(10) Patent No.: US 8,531,802 B2
(45) Date of Patent: Sep. 10, 2013

(54) MAGNETIC STRUCTURE FREE LAYER STABILIZATION

(75) Inventors: Antonia Tsoukatos, Maple Grove, MN (US); Eric Walter Singleton, Maple Plain, MN (US)

(73) Assignee: Seagate Technology LLC, Cupertino, CA (US)

( * ) Notice: Subject to any disclaimer, the term of this patent is extended or adjusted under 35 U.S.C. 154(b) by 318 days.

(21) Appl. No.: 12/972,182

(22) Filed: Dec. 17, 2010

(65) Prior Publication Data

US 2012/0154955 A1 Jun. 21, 2012

(51) Int. Cl.
*G11B 5/39* (2006.01)

(52) U.S. Cl.
USPC ............................ 360/324.12; 360/319

(58) Field of Classification Search
USPC ............... 360/324.1, 324.11, 324.12, 324.2, 360/319
See application file for complete search history.

(56) References Cited

U.S. PATENT DOCUMENTS

| | | | |
|---|---|---|---|
| 5,923,505 A | 7/1999 | Kroes et al. | |
| 6,292,335 B1 | 9/2001 | Gill | |
| 6,473,279 B2 | 10/2002 | Smith et al. | |
| 6,563,682 B1* | 5/2003 | Sugawara et al. | 360/324.2 |
| 6,671,139 B2 | 12/2003 | Carey et al. | |
| 6,704,175 B2* | 3/2004 | Li et al. | 360/324.11 |
| 6,741,432 B2 | 5/2004 | Pinarbasi | |
| 6,831,816 B2 | 12/2004 | Gill | |
| 7,446,986 B2* | 11/2008 | Araki et al. | 360/324.12 |
| 7,602,591 B2* | 10/2009 | Sbiaa et al. | 360/324.12 |
| 7,663,848 B1* | 2/2010 | Huai et al. | 360/324.2 |
| 2002/0034056 A1* | 3/2002 | Chen et al. | 360/324.12 |
| 2006/0103991 A1* | 5/2006 | Hoshino et al. | 360/324.12 |
| 2006/0176621 A1* | 8/2006 | Gill | 360/324.12 |
| 2006/0187591 A1* | 8/2006 | Gill et al. | 360/324.12 |
| 2007/0195469 A1* | 8/2007 | Takashita et al. | 360/324.12 |
| 2007/0211393 A1* | 9/2007 | Gill | 360/324.12 |
| 2009/0185315 A1* | 7/2009 | Xue et al. | 360/314 |

OTHER PUBLICATIONS

T.C. Schulthess and W.H. Butler, "Coupling mechanisms in exchange biased films" Exchange Bias II, Apr. 15, 1999, Journal of Applied Physics, vol. 85, No. 8, 6 pages.

Hung et al., "Exchange biasing and thermal stability of CoFe/PtPdMn films" Exchange Biasing I: Experiment and Theory, May 1, 2000, Journal of Applied Physics, vol. 87, No. 9, 3 pages.

Sanders et al., "Stabilization Films for Dual Stripe Read Sensors" Sep. 5, 2000, IEEE Transactions on Magnetics, vol. 36, No. 5, 3 pages.

Deac et al., "Current-induced magnetization switching in exchange-biased spin valves for current-perpendicular-to-plane giant magnetoresistance heads" Feb. 9, 2006, Physical Review B 73, 064414 (2006) The American Physical Society, 8 pages.

Barker et al., "A model of the exchange bias setting process in magnetic read sensors" Jul. 13, 2009, Applied Physics Letters 95, 022504 (2009), 2009 American Institute of Physics, 3 pages.

Kanai et al., "Advanced Spin-Valve GMR Head" UDC 681.327.634, Fujitsu Sci. Tech. J., 37, 2,p. 174-182 (Dec. 2001).

* cited by examiner

*Primary Examiner* — Jefferson Evans
(74) *Attorney, Agent, or Firm* — HolzerIPLaw, PC

(57) ABSTRACT

A magnetic layered structure is presently disclosed comprising a pinned layer, a first anti-ferromagnetic layer that defines a magnetic orientation of the pinned layer, a free layer, a second anti-ferromagnetic layer that biases the free layer to a magnetic orientation approximately perpendicular to the magnetic orientation of the pinned layer, and a tuning layer positioned between and in contact with the second anti-ferromagnetic layer and the free layer that tunes free layer bias to a desired level.

21 Claims, 5 Drawing Sheets

MAGNETIC STRUCTURE FREE LAYER STABILIZATION

SUMMARY

Implementations described and claimed herein provide a magnetic layered structure comprising a pinned layer, a first anti-ferromagnetic layer that defines a magnetic orientation of the pinned layer, a free layer, a second anti-ferromagnetic layer that biases the free layer to a magnetic orientation approximately perpendicular to the magnetic orientation of the pinned layer, and a tuning layer positioned between and in contact with the second anti-ferromagnetic layer and the free layer that tunes free layer bias to a desired level.

Implementations described and claimed herein also provide a method of biasing a magnetic layered structure comprising defining a magnetic orientation of a pinned layer using a first anti-ferromagnetic layer, biasing a magnetic orientation of a free layer using a second anti-ferromagnetic layer, wherein the defined magnetic orientation of the pinned layer is approximately perpendicular to the biased magnetic orientation of the free layer, and tuning free layer bias to a desired level using a tuning layer positioned between and in contact with the second anti-ferromagnetic layer and the free layer.

Implementations described and claimed herein also provide a transducer for a magnetic disc drive comprising a reader including a pinned layer, a first anti-ferromagnetic layer that defines a magnetic orientation of the pinned layer, a free layer, a second anti-ferromagnetic layer that biases the free layer to a magnetic orientation approximately perpendicular to the magnetic orientation of the pinned layer, and a tuning layer positioned between and in direct contact with the second anti-ferromagnetic layer and the free layer that tunes free layer bias to a desired level.

Other implementations are also described and recited herein.

BRIEF DESCRIPTIONS OF THE DRAWINGS

DETAILED DESCRIPTIONS

Figure 1:
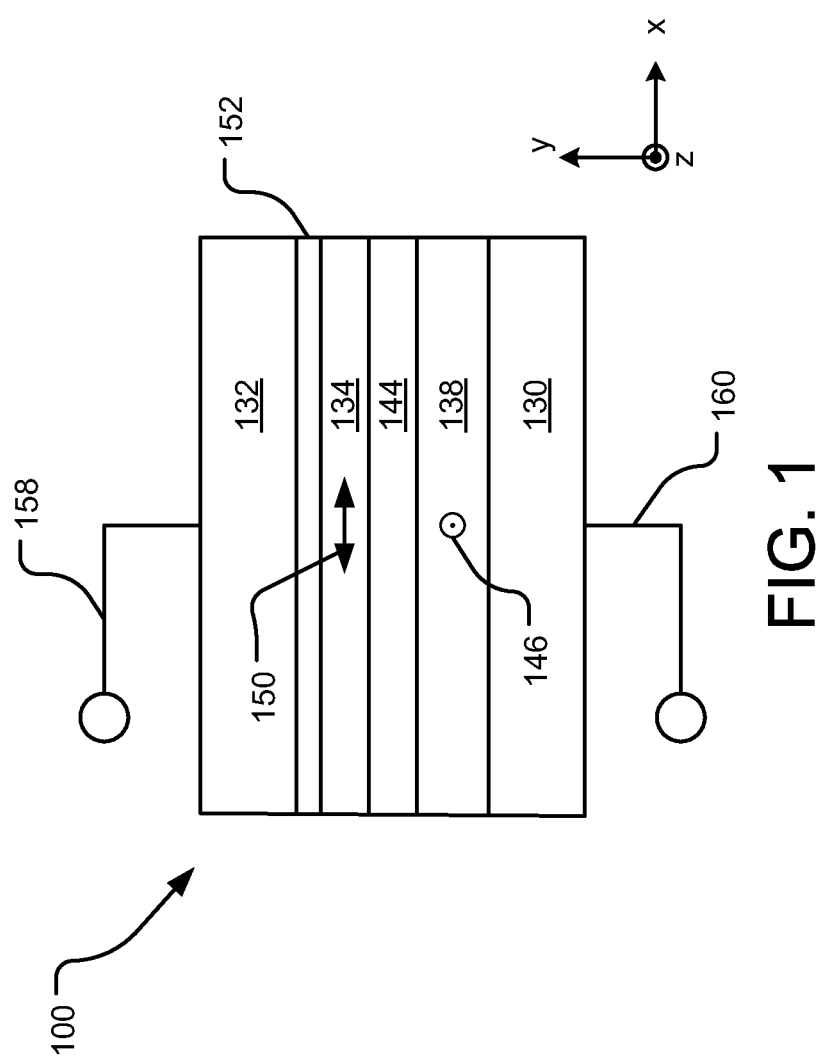
FIG. 1 illustrates an example magnetic structure with free layer stabilization.

Information and communication systems increasingly handle huge amounts of data, placing heavy demands on magnetic media storage capacity and performance. As areal recording densities increase, smaller, more sensitive read element heads and magnetic-based storage devices are desired that are effectively shielded from noise in deciphering a read signal.

A read element may include an anti-ferromagnetic (AFM) layer, a pinned layer, a spacer layer, and a free layer. The AFM layer emits an exchange-coupling field that fixes the magnetization orientation of the pinned layer. Magnetization orientation of the free layer rotates according to a detected signal from a magnetic media. The spacer layer serves to separate the magnetic orientation of the pinned layer from the free layer. As the read element passes over magnetic bits on a magnetic media, the magnetic orientation of the bits causes the magnetic orientation of the free layer to shift.

Electrical resistance of the read element is low when the magnetization orientation of the pinned layer and the free layer are parallel. Electrical resistance of the read element is high when the magnetization orientation of the pinned layer and the free layer are anti-parallel. Sense current flows into the read element sensor through the electrodes and a change in resistance affects a readback voltage. As a result, orientation of bits on the magnetic media or sensing of bits stored in a memory cell can be detected by changes in the readback voltage.

A source of noise interference on read element sensors are edge effects. Edge effects can be the result of side reading or geometry features created during fabrication of the read element sensor. To counteract the edge effects, hard magnetic side shields are placed on each side of the laminated metallic layers of the read element. The hard magnetic side shields shield the free layer from the edge effects and bias the free layer to either a parallel or anti-parallel magnetization orientation. The magnetization bias prevents relatively small interference signals from changing the magnetization orientation of the read element while still allowing the magnetic field from the data bits to affect magnetization orientation of the read element. However, as read elements become smaller and smaller, hard magnetic side shields cannot practically be placed on each side of the laminated metallic layers of the read element. Further, the interface of the hard magnetic side shields with the read element may also be a source of noise.

In one implementation, a read element according to the presently disclosed technology allows for soft magnetic side shielding, which results in a narrower track width of the read element than a corresponding read element with hard magnetic side shielding. The soft magnetic side shielding may be narrower because junction/permanent magnetic interactions are eliminated. Further, the presently disclosed read element provides a detection resolution increase and reduction of noise interference. These advantages mitigate an incremental shield-to-shield spacing increase caused by the additional top AFM layer as compared to a conventional read element.

FIG. 1 illustrates an example magnetic structure 100 with free layer stabilization. First and second electrical leads 158, 160 electrically connect the magnetic structure 100 to a power source (not shown) and conduct a sense current through the magnetic structure 100 perpendicular to the major planes of the layers of the magnetic structure 100. In one implementation, the magnetic structure 100 is implemented as a magnetic memory cell.

The magnetic structure 100 includes a free layer 134 and a pinned layer 138 with a nonmagnetic electrically conductive or nonconductive spacer layer 144 there between. Polarity of the pinned layer 138 is pinned by a bottom AFM layer 130. The bottom AFM layer 130 sets the polarity of the pinned layer 138 (shown schematically by symbol 146) approximately perpendicular to the depicted magnetic structure 100 in a direction toward the depicted magnetic structure 100 and parallel to the major planes of the various magnetic structure 100 (e.g., in the negative z-direction).

A top AFM layer 132 biases the polarity of the free layer 134 (shown schematically by symbols 150) approximately parallel to the depicted magnetic structure 100 and approximately parallel to the major planes of the various magnetic structure 100 layers (e.g., in the x-direction). In some implementations, it is difficult to align the polarity bias of the free layers 134 exactly parallel to the depicted magnetic structure 100 and major planes of the various magnetic structure 100 layers. In one embodiment, the polarity bias of the free layers 134 is within 15 degrees of parallel to the depicted magnetic structure 100 and 15 degrees of parallel to the major planes of the various magnetic structure 100 layers. A greater range may still allow the magnetic structure 100 to function sufficiently, as well.

When the magnetic polarity of the free layer 134 is rotated into the negative z-direction, the symbols 146 and 150 become more anti-parallel which illustrates an increase in the resistance of the magnetic structure 100 to a sense current passing between the first and second electrical leads 158, 160. Conversely, when the magnetic polarity of the free layer 134 is rotated in the positive z-direction, the symbols 146 and 150 become more parallel, which illustrates a decrease in the resistance of the magnetic structure 100 to the sense current passing between the first and second electrical leads 158, 160.

A tuning layer 152 is positioned between the top AFM layer 132 and the free layer 134. The thickness of the tuning layer 152 is tuned or optimized to provide a desired bias level (i.e., magnetic coupling) to the free layer 134. In other words, the bias level of the free layer 134 is tuned to a desired level by selecting a material and/or thickness of the tuning layer 152. For example, a particularly thin tuning layer 152 will place the top AFM layer 132 and the free layer 134 close together, thus the polarity bias from the top AFM layer 132 on the free layer 134 will be particularly strong (or stiff). Conversely, a particularly thick tuning layer 152 will place the top AFM layer 132 and the free layer 134 not as close together, thus the polarity bias from the top AFM layer 132 on the free layer 134 will not be as strong (or more flexible). Strength of the bias level is selected to obtain a desired sensitivity of the magnetic structure 100 while allowing the magnetic structure 100 to remain sufficiently stable. In other words, the turning layer 152 decouples the free layer 134 from the top AFM layer 132 and reduces dispersion of the free layer magnetic moment.

As compared to an implementation without a spacer layer, incorporation of the tuning layer 152 in the magnetic structure 100 allows a high pinning field strength of the top AFM layer 132 to be maintained while reducing dispersion of the pinning field. Further, the tuning layer 152 reduces coercivity of the pinning field of the top AFM layer 132. Low coercivity is desirable to reduce effects of external thermal and/or magnetic signals on the polarity of the top AFM layer 132. Different materials and thicknesses of the tuning layer 152 affect pinning field strength, dispersion of the pinning field, and coercivity of the tuning layer 152.

Figure 2:
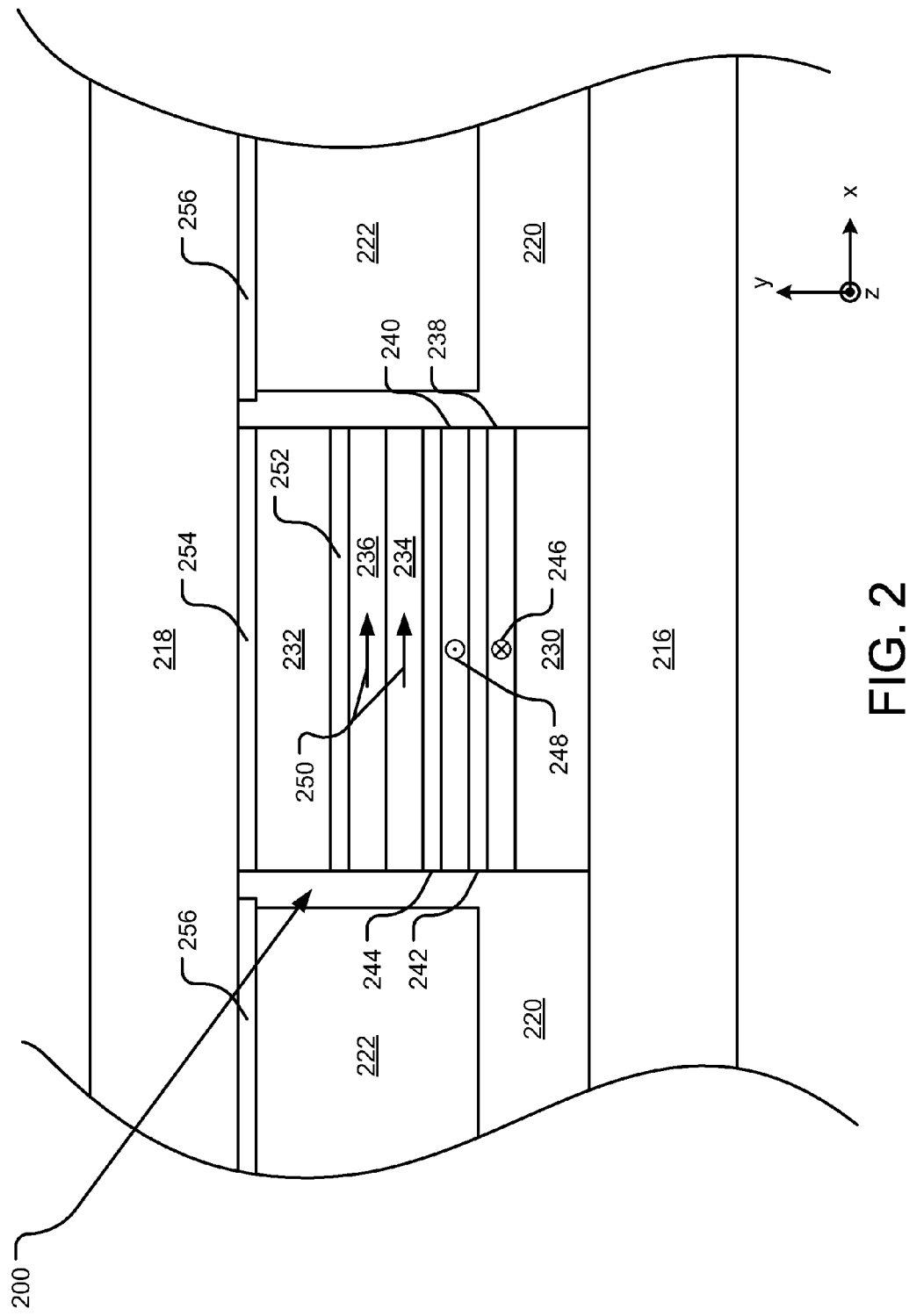
FIG. 2 illustrates an air bearing surface of an example read element with dual AFM layers and soft magnetic side shields.

FIG. 2 illustrates an air bearing surface of an example read element 200 with dual AFM layers 230, 232 and soft magnetic side shields 222. The read element 200 is shown as viewed from a magnetic media looking upwards at the air bearing surface (ABS) of the read element 200. The read element 200 is located between first and second shields 216, 218 that also serve as first and second electrical lead layers. The first and second shields 216, 218 conduct a sense current through the read element 200 perpendicular to the major planes of the layers of the read element 200. The read element 200, in this implementation, includes first and second free layers 234, 236 laminated together. In other implementations, there is only one free layer or more than two free layers laminated together.

The read element 200 also includes a pinned layer lamination including first and second pinned layers 238, 240 and an interlayer 242 between the pinned layers 238, 240. The interlayer 242 is a nonmagnetic electrically conductive anti-parallel coupling (APC) that interfaces the two pinned layers 238, 240 together. In some implementations, layers 238, 240, 242 together form a synthetic anti-ferromagnet (SAF). A nonmagnetic electrically conductive or nonconductive spacer or barrier layer 244 is located between the free layer lamination 234, 236 and the pinned layer lamination.

Polarity of the pinned layers 238, 240 is pinned by a bottom AFM layer 230. The bottom AFM layer 230 sets the polarity of pinned layer 238 (shown schematically by symbol 246) approximately perpendicular to the depicted ABS plane in a direction toward the depicted ABS and parallel to the major planes of the various read element 200 layers (e.g., in the negative z-direction). Polarity of AFM layer 232 (shown schematically by symbol 248) is oriented anti-parallel (e.g., in the z-direction) to polarity 246 by a strong anti-parallel coupling between the pinned layers 238, 240 provided by the interlayer 242. In another implementation, polarity of the pinned layer 238 is oriented away from the depicted ABS and polarity of the AFM layer 232 is oriented toward the depicted ABS. In yet another implementation, the polarities of pinned layers 238, 240 are parallel to the depicted ABS plane.

The top AFM layer 232 biases the polarity of the laminated free layers 234, 236 (shown schematically by symbols 250) approximately parallel to the depicted ABS and approximately parallel to the major planes of the various read element 200 layers (e.g., in the x-direction). In some implementations, it is difficult to align the polarity bias of the laminated free layers 234, 236 exactly parallel to the depicted ABS and major planes of the various read element 200 layers. In one embodiment, the polarity bias of the laminated free layers 234, 236 is within 15 degrees of parallel to the depicted ABS and 15 degrees of parallel to the major planes of the various read element 200 layers. A greater range may still allow the read element 200 to function sufficiently, as well.

When a field signal from a magnetic media rotates the magnetic polarity of the laminated free layers 234, 236 into the depicted ABS (e.g., in the negative z-direction), the symbols 248 and 250 become more anti-parallel which illustrates an increase in the resistance of the read element 200 to a sense current passing between the first and second shields 216, 218. Conversely, when a field signal from the magnetic media rotates the magnetic polarity of the laminated free layers 234, 235 out of the depicted ABS (e.g., in the z-direction), the symbols 248 and 250 become more parallel, which illustrates a decrease in the resistance of the read element 200 to the sense current passing between the first and second shields 216, 218.

Tuning layer 252 is positioned between the top AFM layer 232 and the free layers 234, 236. The thickness of the tuning layer 252 is tuned or optimized to provide a desired bias level (i.e., magnetic coupling) to the free layers 234, 236. In other words, the bias level of the free layers 234, 236 is tuned to a desired level by selecting a material and/or thickness of the tuning layer 252. For example, a particularly thin tuning layer 252 will place the top AFM layer 232 and free layers 234, 236 close together, thus the polarity bias from the top AFM layer 232 on the free layers 234, 236 will be particularly strong (or stiff). Conversely, a particularly thick tuning layer 252 will place the top AFM layer 232 and free layers 234, 236 not as close together, thus the polarity bias from the top AFM layer 232 on the free layers 234, 236 will not be as strong (or more flexible). Strength of the bias level is selected to obtain a desired sensitivity of the read element 200 while allowing the read element 200 to remain sufficiently stable.

An AFM cap 254 is placed on the AFM layer 232 to protect the AFM layer 232 from corrosion and subsequent processing steps. In some implementations, an additional seed layer is placed between the AFM layer 232 and second shield 218 that prepares the read element 200 for application of the second shield 218. For example, the seed layer is adapted to accept a plating operation that places the second shield 218 on the read element 200.

As compared to an implementation without a spacer layer, incorporation of the tuning layer 252 in the read element 200 allows a high pinning field strength of the top AFM layer 232 to be maintained while reducing dispersion of the pinning field. Further, the tuning layer 252 reduces coercivity of the pinning field of the top AFM layer 232. Low coercivity is desirable to reduce effects of external thermal and/or magnetic signals on the polarity of the top AFM layer 232. Different materials and thicknesses of the tuning layer 252 affect pinning field strength, dispersion of the pinning field, and coercivity of the tuning layer 252. In some implementations the tuning layer 252 is sandwiched between two layers of an AFM layer rather than adjacent top AFM layer 232 as shown in FIG. 2. In other implementations, there are multiple spacer layers (soft magnetic and/or nonmagnetic) to maximize pinning field strength while minimizing dispersion of the pinning field. The tuning layer 252 may decrease dispersion of the pinning field by as much as 50% without causing major degradation of the pinning field.

Sides of the read element 200 are surrounded by a non-magnetic, non-conductive filler material 220 (e.g., alumina). Further, soft magnetic side shields 222 are used on the sides of the read element 200 to reduce electromagnetic interference (e.g., side reading consideration and stray field noise), primarily x-direction interference and/or z-direction interference. The soft magnetic side shields 222 are separated from the top shield 218 by side shield caps 256 and bottom shield 216 by the filler material 220. Use of soft magnetic side shields 222 (as opposed to hard magnetic side shields) allows for sub-100 nm thickness of the read element 200 and shields 216, 218 collectively, as discussed above. In one implementation, the side shields 222 are NiFe. In other implementations, the side shields 222 are non-magnetic. In still other implementations, the side shields 222, top shield 218, and bottom shield 216 are made of the same soft magnetic material. In yet other implementations, the shields 222, top shield 218, and bottom shield 216 are made of a non-magnetic material.

One implementation of the presently disclosed technology utilizes the following materials and thicknesses. The bottom AFM layer 230 may be made of IrMn and/or PtMn and have a thickness ranging from 30-250 Angstrom(Å). Each of the pinning layers 238, 240 may also be made of high coercivity materials such as CoPt, CoPtCr, FePt, CoPtCrTa, and/or various materials derived from CoPt, CoPtCr, FePt, and/or CoPtCrTa and have a thickness ranging from 20-150 A. In other implementations, each of the pinning layers 238, 240 may be made of low coercivity materials such as CoFe, CoNiFe, and/or CoFeB. The interlayer 242 may be made of chromium, ruthenium, and/or rhodium and have a thickness ranging up to 10 A. In some implementations, there is no interlayer 242. The spacer layer 244 may be made of titanium oxide, alumina, magnesium oxide, and/or a conductive material (e.g., copper or a copper alloy) and have a thickness ranging up to 30 A.

The free layer(s) 234, 236 may be made of NiFe and/or CoFe and have thicknesses ranging from 20-50 A. The tuning layer 252 may be made of chromium, ruthenium, tantalum, and/or rhodium and have a thickness ranging up to 10 A. In some implementations, there is no tuning layer 252. The top AFM layer 232 may be made of IrMn and/or PtMn and have a thickness ranging from 30-100 A. The AFM cap 254 may be made of chromium, ruthenium, and/or rhodium and have a thickness ranging up to 50 A. In some implementations, there is no AFM cap 254. The soft magnetic side shields 222 may be made of NiFe alloys and have a thickness ranging from 50-200 A. The side shield caps 256 may be made of chromium, ruthenium, and/or rhodium and have a thickness ranging up to 100 A. In some implementations, there are no side shield caps 256. Each of the first and second shields 216, 218 may be made of NiFe alloys and have a thickness ranging from 1-2 microns.

In various implementations, the presently disclosed technology is applicable to high density perpendicular media, discrete track recording (DTR), and/or bit patterned media (BPM). Further, the presently disclosed technology is capable of thermal reliability up to at least 200°-250° C.

Figure 3:
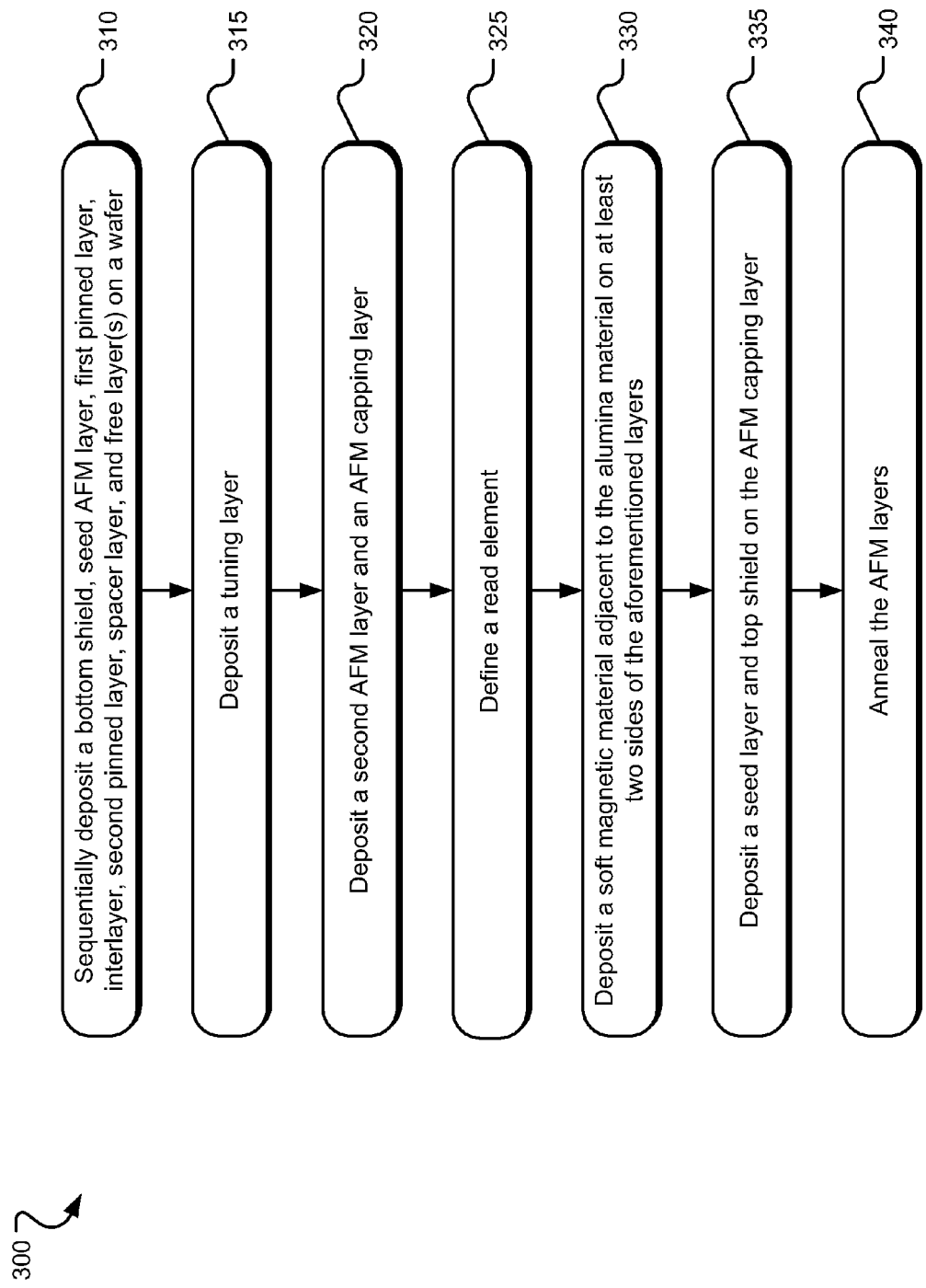
FIG. 3 illustrates example operations for manufacturing a magnetic structure according to the presently disclosed technology.

FIG. 3 illustrates example operations 300 for manufacturing a read element according to the presently disclosed technology. In a deposition operation 310, a bottom shield, seed AFM layer, first pinned layer, interlayer, second pinned layer, spacer layer, and free layer(s) are sequentially deposited on a semiconductor wafer (e.g., an AlTiC wafer) using conventional transducer processing techniques. In a second deposition operation 315, a tuning layer is deposited on the free layer(s) of the read element. In many implementations, the second deposition operation 315 is performed at a temperature ranging between 20° C. and 400° C.

In a third deposition operation 320, a second AFM layer and an AFM capping layer are sequentially deposited on the tuning layer. Substrate temperature during deposition and thickness of the second AFM layer control bias in the free layer(s). In one implementation, the objective for the second AFM pinning of the free layers is to establish a free layer bias in the order of 250-800 Oe in a direction perpendicular to the first AFM pinning direction. Further, thickness of the tuning layer also affects the pinning in the free layers. The thicknesses of the free layer(s) and AFM layers, and substrate temperatures during deposition are also optimized to maintain thermal stability, repeatability, and bias on the read element.

In a read element definition operation 325, photolithography and ion beam etch processing set the reader geometry for a desired read track width. Further, an alumina material is deposited over exposed sides of the aforementioned layers. The alumina material electrically isolates the aforementioned layers from electrical transmission in a direction coplanar to the aforementioned layers (e.g., to adjacent soft magnetic material deposited in a fourth deposition operation 330). As a result, the alumina material facilitates electrical conduction between the top and bottom shields, allowing for efficient read element operation.

In the fourth deposition operation 330, a soft magnetic material is deposited adjacent to the alumina material. The soft magnetic material serves to magnetically shield the free layer(s) from external magnetic interference. In one implementation, soft magnetic material is coplanar to at least the free layer(s), tuning layer, and second AFM layer. The soft magnetic material may also be coplanar with one or more of the seed AFM layer, first pinned layer, interlayer, second pinned layer, spacer layer, and AFM capping layer. In some implementations, an additional capping layer is applied over the soft magnetic material. The capping layer(s) have adequate thickness to maintain the top exchange bias integrity through the definition process, post deposition.

In a fifth deposition operation 335, a seed layer and top shield are deposited on the AFM capping layer. In an annealing operation 340, the AFM layers are annealed to set the magnetic orientation of the AFM layers. In many implementations, the magnetic orientation of the second AFM layer is set perpendicular to the magnetic orientation of the first AFM layer in a direction co-planar to on or more of the aforementioned layers. In some implementation, the annealing operation 340 is performed between 1-5 kGauss at a temperature ranging from 215-235 degrees Celsius. In operation, electricity is conducted between the bottom shield and the top shield. Polarity of the free layer(s) changes with proximity to magnetic bits. As the polarity of the free layer(s) changes, overall resistance of the aforementioned layered structure changes. Changes in the resistance of current flowing in a direction perpendicular to the aforementioned layers affects a voltage differential between the bottom shield and the top shield. As a result, changes in the voltage differential are used to detect the presence and/or orientation of magnetic bits. Upon completion of the aforementioned stack deposition, photolithography and etch processes may follow without changes to customary processing of the transducer.

Figure 4:
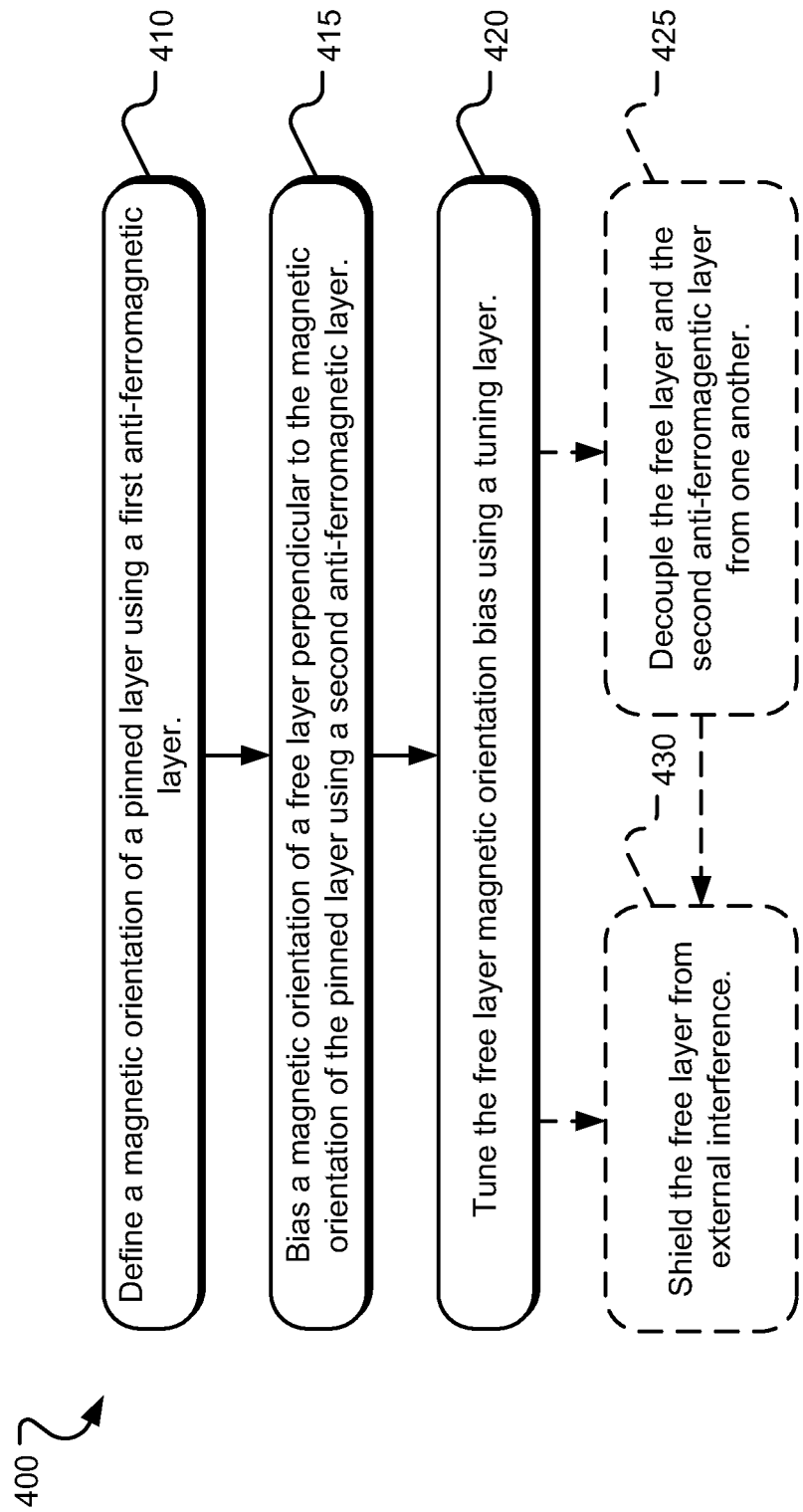
FIG. 4 illustrates example operations for biasing a magnetic layered structure according to the presently disclosed technology.

FIG. 4 illustrates example operations 400 for biasing a magnetic layered structure according to the presently disclosed technology. A defining operation 410 defines a magnetic orientation of a pinned layer using a first anti-ferromagnetic layer in the magnetic layered structure. A biasing operation 415 biases a magnetic orientation of a free layer in a direction perpendicular to the magnetic orientation of the pinned layer defined in operation 410 using a second anti-ferromagnetic layer in the magnetic layered structure.

A tuning operation 420 tunes the free layer magnetic orientation to a desired level using a tuning layer. The tuning operation 420 balances reduction of noise interference with detection resolution within the magnetic layered structure. At least the material composition and thickness of the tuning layer affects the amount of tuning in operation 420. An optional decoupling operation 425 decouples the free layer and the second anti-ferromagnetic layer from one another. In one implementation, a spacer layer positioned between the free layer and the second anti-ferromagnetic layer provides the decoupling of the operation 425. An optional shielding operation 430 shields the free layer from external interference. In one implementation, one or more side shields placed adjacent the free layer along a major plane of the free layer provides the shielding of operation 430.

Figure 5:
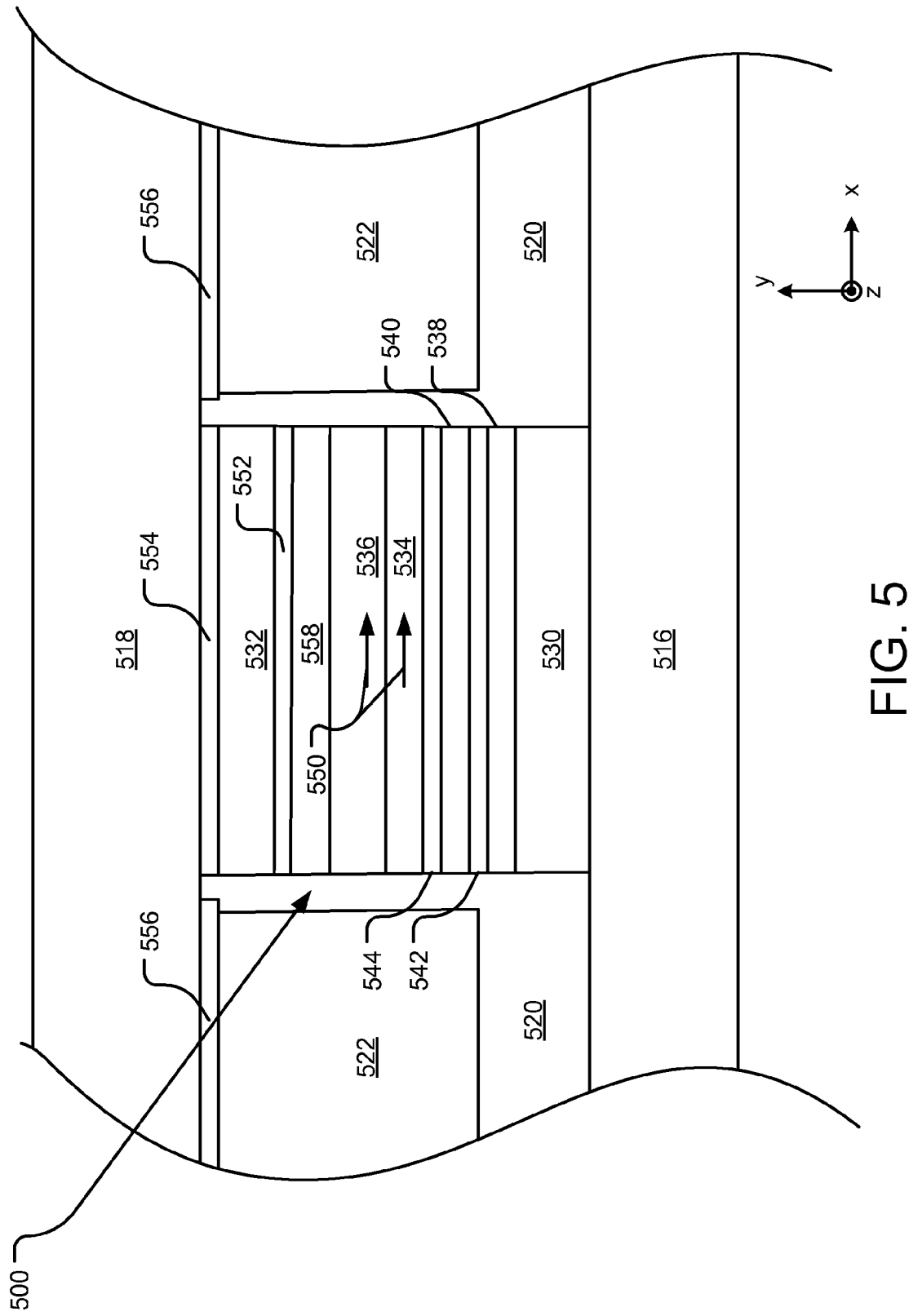
FIG. 5 illustrates an air bearing surface of another example read element with multiple AFM layers and soft magnetic side shields.

FIG. 5 illustrates an air bearing surface of an example read element 500 with three AFM layers 530, 532, and 558. The read element 500 is shown as viewed from a magnetic media looking upwards at the air bearing surface (ABS) of the read element 500. The read element is located between first and second shields 516 and 518. The read element 500 includes first and second free layers 534 and 536 laminated together. The read element 500 also includes a pinned layer lamination including first and second pinned layers 538, 540, and an interlayer 542 between the pinned layers 538, 540. A non-magnetic electrically conductive or nonconductive spacer or barrier layer 544 is located between the free layer lamination 534, 536, and the pinned layer lamination.

Polarity of the pinned layers 538, 540 is pinned by a bottom AFM layer 530. The top AFM layer 552 and a middle AFM layer 558 biases the polarity of the laminated free layers 534, 536. The polarity of the pinned layers 538, 540, free layers 534, 536, and top and bottom AFM layers 530 and 552 may be the same or similar to such layers illustrated and described with respect to FIG. 2.

A tuning element 552 is sandwiched between the top AFM layer 532 and the middle AFM layer 558. The thickness of the tuning layer 552 may be tuned or optimized to provide a desired bias level (i.e., magnetic coupling) to the free layers 534, 536. Such tuning may be performed in a same or a similar manner to that described above with respect to FIG. 2.

Sides of the read element 500 are surrounded by a non-magnetic, non-conductive filler material 520 (e.g., alumina). Soft magnetic side shields 522 are used on the side of the read element 500. The soft magnetic side shields 522 are separated from the top shield 518 by side shield caps 556 and bottom shield 516 by the filler material 520.

The above specification, examples, and data provide a complete description of the structure and use of exemplary embodiments of the invention. Since many embodiments of the invention can be made without departing from the spirit and scope of the invention, the invention resides in the claims hereinafter appended. Furthermore, structural features of the different embodiments may be combined in yet another embodiment without departing from the recited claims.

What is claimed is:

1. A magnetic layered structure comprising:
   a pinned layer;
   a first anti-ferromagnetic layer that defines a magnetic orientation of the pinned layer;
   a free layer;
   a second anti-ferromagnetic layer and a third anti-ferromagnetic layer that bias the free layer to a magnetic orientation approximately perpendicular to the magnetic orientation of the pinned layer; and
   a tuning layer that tunes free layer bias to a desired level and is separated from the free layer and positioned between the second anti-ferromagnetic layer and the third anti-ferromagnetic layer.

2. The magnetic layered structure of claim 1, further comprising:
   one or more side shields positioned adjacent the free layer along a major plane of the free layer.

3. The magnetic layered structure of claim 2, wherein the side shields include a soft magnetic material.

4. The magnetic layered structure of claim 2, wherein the side shields include a non-magnetic material.

5. The magnetic layered structure of claim 1, further comprising:
   two electrodes, each positioned on opposite sides of the layered structure, configured to conduct current through the layered structure along an axis approximately perpendicular to a major plane of the free layer.

6. The magnetic layered structure of claim 1, further comprising:
   a spacer layer that magnetically separates the pinned layer from the free layer.

7. The magnetic layered structure of claim 1, further comprising:
   a capping layer that protects the second anti-ferromagnetic layer from post deposition damage.

8. The magnetic layered structure of claim 1, wherein the pinned layer, first anti-ferromagnetic layer, free layer, and second anti-ferromagnetic layer comprise a read element sensor.

9. The magnetic layered structure of claim 1, wherein approximately perpendicular is perpendicular +/−15 degrees.

10. The magnetic layered structure of claim 1, wherein the first and second anti-ferromagnetic layers comprise IrMn or PtMn and have a thickness greater than or equal to 30 Å and less than or equal to 250 Å.

11. The magnetic layered structure of claim 1, wherein the free layer comprises a first free layer and a second free layer.

12. The magnetic layered structure of claim 1, wherein the structure further comprises multiple spacer layers including at least one of soft magnetic or nonmagnetic material to increase pinning field strength.

13. The magnetic layered structure of claim 1, wherein the tuning layer decouples the free layer and the second anti-ferromagnetic layer while reducing dispersion of a free layer magnetic moment.

14. A method of biasing a magnetic layered structure, comprising:
   defining a magnetic orientation of a pinned layer using a first anti-ferromagnetic layer;
   biasing a magnetic orientation of a free layer using a second anti-ferromagnetic layer and a third anti-ferromagnetic layer, wherein the defined magnetic orientation of the pinned layer is approximately perpendicular to the biased magnetic orientation of the free layer; and
   tuning free layer bias to a desired level using a tuning layer that decouples the free layer and the second anti-ferromagnetic layer wherein the tuning layer is separated from the free layer and positioned between the second anti-ferromagnetic layer and the third anti-ferromagnetic layer.

15. The method of claim 14, further comprising:
   shielding the free layer from external electromagnetic and/or thermal interference using one or more side shields positioned adjacent the free layer along a major plane of the free layer.

16. The method of claim 14, further comprising:
   conducting current along an axis approximately perpendicular to a major plane of the free layer between two electrodes positioned on opposite sides of the first anti-ferromagnetic layer, pinned layer, free layer, and second anti-ferromagnetic layer.

17. The method of claim 14, further comprising:
   decoupling the free layer and the second anti-ferromagnetic layer while reducing dispersion of a free layer magnetic moment.

18. The method of claim 14, further comprising:
   decoupling the free layer and the second anti-ferromagnetic layer while reducing dispersion of a free layer magnetic moment.

19. A transducer for a magnetic disc drive comprising:
   a reader, including
      a pinned layer;
      a first anti-ferromagnetic layer that defines a magnetic orientation of the pinned layer;
      a free layer;
      a second anti-ferromagnetic layer and a third anti-ferromagnetic layer that bias the free layer to a magnetic orientation approximately perpendicular to the magnetic orientation of the pinned layer; and
      a tuning layer that tunes free layer bias to a desired level, wherein the tuning layer is separated from the free layer and positioned between the second anti-ferromagnetic layer and the third antiferromagnetic layer.

20. The transducer of claim 19, wherein the reader further includes one or more side shields positioned adjacent the free layer along a major plane of the free layer that shields the free layer from external electromagnetic interference.

21. The transducer of claim 19, wherein the reader further includes two electrodes, each positioned on opposite sides of the layered structure, configured to conduct current through the layered structure along an axis approximately perpendicular to a major plane of the free layer.

* * * * *